United States Patent
Sakagami

(10) Patent No.: US 8,350,926 B2
(45) Date of Patent: Jan. 8, 2013

(54) IMAGING APPARATUS, METHOD OF PROCESSING IMAGING RESULT, IMAGE PROCESSING APPARATUS, PROGRAM OF IMAGING RESULT PROCESSING METHOD, RECORDING MEDIUM STORING PROGRAM OF IMAGING RESULT PROCESSING METHOD, AND IMAGING RESULT PROCESSING SYSTEM

(75) Inventor: Junichi Sakagami, Tokyo (JP)

(73) Assignee: Sony Corporation (JP)

( * ) Notice: Subject to any disclaimer, the term of this patent is extended or adjusted under 35 U.S.C. 154(b) by 447 days.

(21) Appl. No.: 11/921,498

(22) PCT Filed: May 31, 2006

(86) PCT No.: PCT/JP2006/311372
§ 371 (c)(1),
(2), (4) Date: Jul. 8, 2009

(87) PCT Pub. No.: WO2006/129868
PCT Pub. Date: Dec. 7, 2006

(65) Prior Publication Data
US 2010/0066861 A1 Mar. 18, 2010

(30) Foreign Application Priority Data
Jun. 3, 2005 (JP) ................. P2005-163453

(51) Int. Cl.
*H04N 5/76* (2006.01)
(52) U.S. Cl. ................. 348/231.6; 348/231.3
(58) Field of Classification Search ................. 348/231.6
See application file for complete search history.

(56) References Cited

U.S. PATENT DOCUMENTS

| | | | | |
|---|---|---|---|---|
| 5,724,579 | A | * | 3/1998 | Suzuki ................................ 1/1 |
| 6,567,119 | B1 | * | 5/2003 | Parulski et al. ............ 348/207.2 |
| 7,151,564 | B2 | * | 12/2006 | Kubo ........................ 348/231.6 |
| 7,259,786 | B2 | | 8/2007 | Shimizu |
| 7,626,727 | B2 | * | 12/2009 | Sugimori ...................... 358/1.9 |
| 2002/0180879 | A1 | * | 12/2002 | Shiohara ................. 348/333.05 |
| 2003/0090585 | A1 | * | 5/2003 | Anderson ................ 348/333.11 |
| 2003/0179297 | A1 | * | 9/2003 | Parulski et al. ............ 348/207.2 |
| 2003/0234876 | A1 | * | 12/2003 | Bloom et al. ............... 348/231.3 |
| 2004/0056973 | A1 | | 3/2004 | Takaiwa et al. |
| 2004/0119841 | A1 | * | 6/2004 | Shimizu ..................... 348/222.1 |

FOREIGN PATENT DOCUMENTS
EP 0873008 A2 10/1998
(Continued)

OTHER PUBLICATIONS
Supplementary European Search Report EP 06747208, dated Sep. 13, 2010.
(Continued)

*Primary Examiner* — Sinh Tran
*Assistant Examiner* — Christopher K Peterson
(74) *Attorney, Agent, or Firm* — Lerner, David, Littenberg, Krumholz & Mentlik, LLP

(57) ABSTRACT

This invention is applied to a system applied to an electronic still camera, for instance. According to the invention, thumbnail image data DT obtained by thinning RAW data is recorded along with the RAW data DR, and image correction information DS at the time of imaging-result capturing which is used in presentation.

7 Claims, 11 Drawing Sheets

FOREIGN PATENT DOCUMENTS

| | | |
|---|---|---|
| JP | 06-090435 A | 3/1994 |
| JP | 10079913 A | 3/1998 |
| JP | 11-004367 A | 1/1999 |
| JP | 2003-346143 A | 12/2003 |
| JP | 2004-056641 A | 2/2004 |
| JP | 2004-128809 A | 4/2004 |

OTHER PUBLICATIONS

Office Action from Japanese Application No. 2005-163453, dated Feb. 22, 2011.

* cited by examiner

FIG. 5A
FIG. 5B
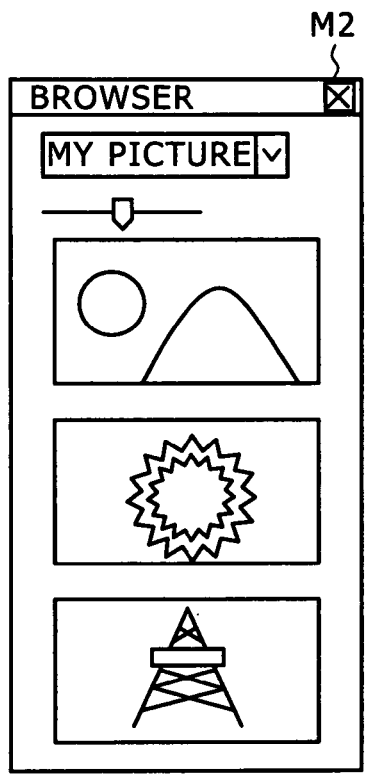
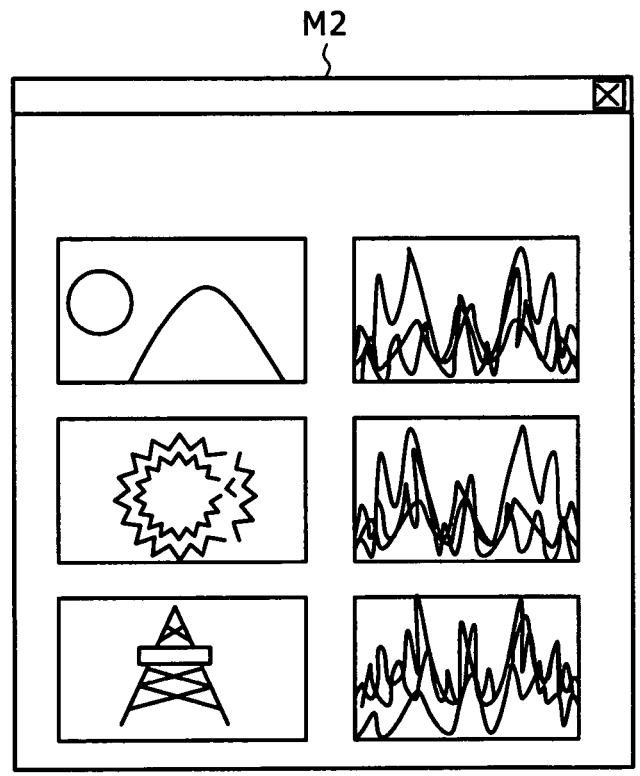

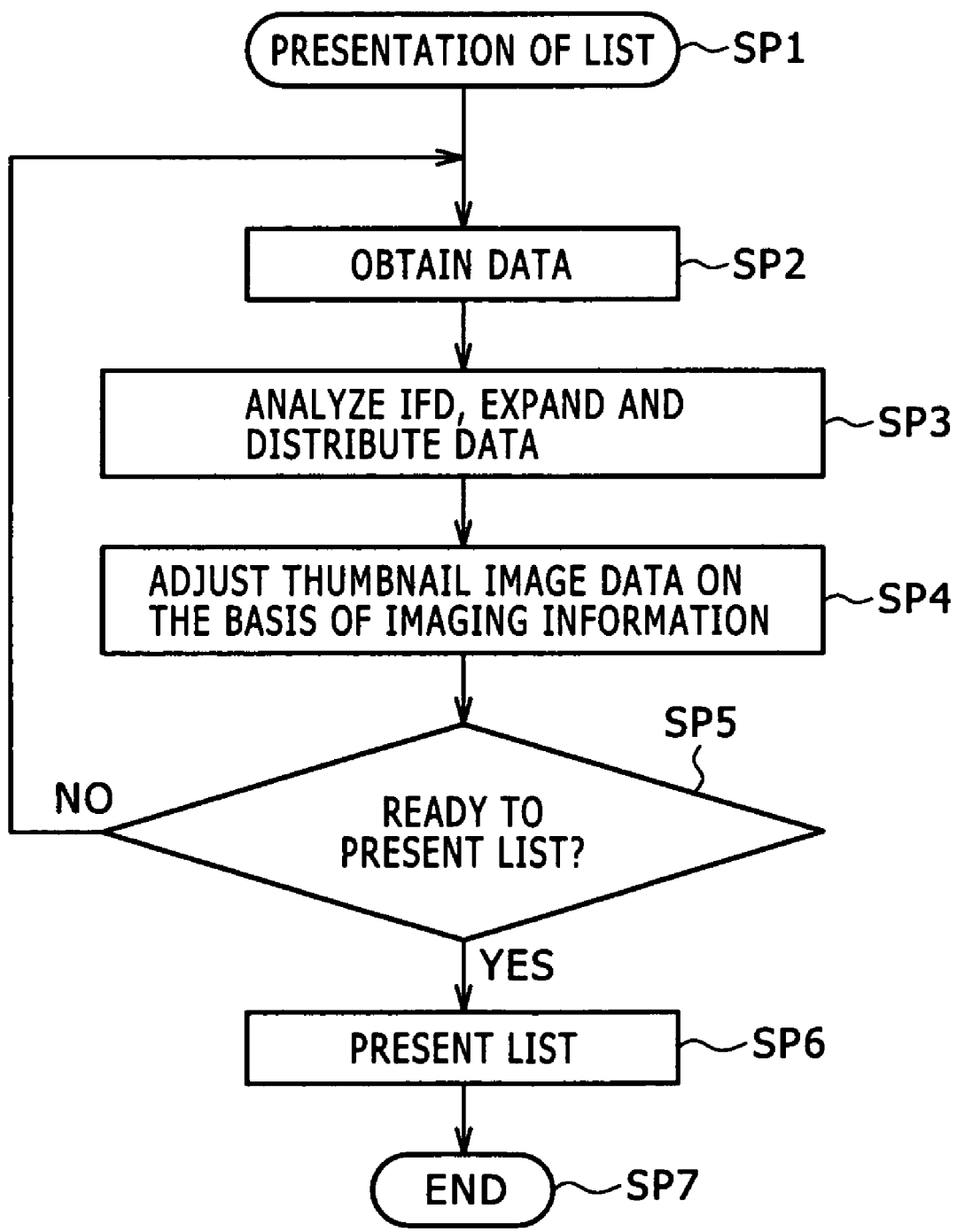

US 8,350,926 B2

IMAGING APPARATUS, METHOD OF PROCESSING IMAGING RESULT, IMAGE PROCESSING APPARATUS, PROGRAM OF IMAGING RESULT PROCESSING METHOD, RECORDING MEDIUM STORING PROGRAM OF IMAGING RESULT PROCESSING METHOD, AND IMAGING RESULT PROCESSING SYSTEM

CROSS REFERENCE TO RELATED APPLICATIONS

The present application is a national phase entry under 35, U.S.C. §371 of International Application No. PCT/JP2006/311372 filed May 31, 2006, published on Dec. 7, 2006 as WO 2006/129868, A1, which claims priority from Japanese Patent Application No. JP 2005-163453 filed in the Japanese Patent Office on Jun. 3, 2005.

TECHNICAL FIELD

The present invention relates to an imaging apparatus, a method of processing an imaging result, an image processing apparatus, a program of an imaging result processing method, a recording medium storing a program of an imaging result processing method, and an imaging result processing system, and is applicable to an electronic still camera, for instance. This invention can reduce time taken to present to a user a thumbnail image of a result of imaging in the form of raw data, by recording thumbnail image data that is obtained by thinning the raw data, along with the raw data and information on image correction at the time of imaging-result capturing that is used for the presentation of the thumbnail image.

BACKGROUND ART

There has been provided an electronic still camera that records on a recording medium a result of imaging in the form of so-called RAW data. The term "RAW data" refers to image data obtained as a result of imaging from an image pickup element and is yet to be subjected to a series of image correction processings that are necessary when presenting the imaging result, such as gamma correction processing, auto white-balance adjustment processing, hue correction processing corresponding to imaging mode, and frequency characteristic correction processing. The imaging mode corresponds to a mode for correcting an image based on a scene imaged, for instance, portrait and landscape.

Regarding to such an electronic still camera related to RAM data, there has been proposed, for instance in JP-A-6-90435 and JP-A-2003-346143, a method according to which when an imaging result recorded on a recording medium is processed by a computer, a thumbnail image is generated by thinning RAW data recorded on a recording medium, and this thumbnail image is presented as the imaging result. According to this method, a processing of preview is implemented by use of the thumbnail image, thereby reducing time taken for the user to view a result of an edit, and enhancing the user-friendliness.

There is known a type of electronic still camera that records on a recording medium an imaging result that has been subjected to an image adjustment processing. Such a type of electronic still camera generates an index thumbnail image by thinning adjusted image data, which is the image data having been subjected to the image adjustment processing, and records the index thumbnail image along with the imaging result having been subjected to the image adjustment processing, on the recording medium and in a file format such as EXIF (Exchangeable Image file Format). The electronic still camera of this type can easily present in the form of a list, imaging results recorded on a recording medium, by using the index thumbnail images recorded along with the imaging results.

The method disclosed in JP-A-6-90435 and others takes a long time to generate the thumbnail images, and accordingly takes a long time to present, in the form of the list of the thumbnail images, the imaging results recorded on the recording medium. Hence, this method is disadvantageously user-unfriendly.

DISCLOSURE OF THE INVENTION

The invention has been developed in view of the above-described situations, and the invention is to propose an imaging apparatus, a method of processing an imaging result, a program of an imaging result processing method, a recording medium storing a program of an imaging result processing method, and a system of an imaging apparatus, that can reduce time taken to present, in the form of a thumbnail image, RAW data as an imaging result to a user.

To solve the problem, the invention provides an imaging apparatus characterized by including: an image pickup element for outputting an imaging result of an optical image formed on an imaging surface; an optical system for forming the optical image on the imaging surface; an analog-to-digital converting portion for converting the imaging result from analog to digital and outputting image data yet to be corrected; an image processing portion for subjecting the image data to an image correction processing and outputting the image data subjected to the image correction processing; a display portion for presenting an image of the image data subjected to the image correction processing; a pre-correction thumbnail-image-data generating portion for generating thumbnail image data yet to be corrected, by thinning the image data yet to be corrected; and a data outputting portion for creating a file of the imaging result from the image data yet to be corrected, the thumbnail image data yet to be corrected, and imaging information at the time of imaging-result capturing which includes at least image correction information which specifies the image correction processing by the image processing portion, and outputting the file.

The imaging apparatus of the invention is characterized by including: an image pickup element for outputting an imaging result of an optical image formed on an imaging surface; an optical system for forming the optical image on the imaging surface; an analog-to-digital converting portion for converting the imaging result from analog to digital and outputting image data yet to be corrected; an image processing portion for subjecting the image data to an image correction processing and outputting the image data subjected to the image correction processing; a display portion for presenting an image of the image data subjected to the image correction processing; a pre-correction thumbnail-image-data generating portion for generating thumbnail image data yet to be corrected, by thinning the image data yet to be corrected; and a data outputting portion for creating a file of the imaging result from the image data yet to be corrected, the thumbnail image data yet to be corrected, and imaging information at the time of imaging-result capturing which includes at least image correction information which specifies the image correction processing by the image processing portion, and outputting the file. Hence, when the file of the imaging result is processed, the thumbnail image data is corrected by the imaging information at the time of imaging-result capturing and then presented, thereby enabling to present to the user the RAW data as the imaging result, in the form of the thumbnail image, in time significantly shorter than the case where the thumbnail image is generated from the RAW data and then presented. Thus, the time taken to present to the user the RAW data as the imaging result, in the form of the thumbnail image, is reduced.

The invention also provides an imaging result processing method for subjecting image data of an imaging result obtained by an image pickup element to an image correction processing, and presenting the image data subjected to the image correction processing on a display portion, the method being characterized by including the step of: creating a file of the imaging result from the image data yet to be corrected, thumbnail image data yet to be corrected which is obtained by thinning the image data yet to be corrected, and imaging information at the time of imaging-result capturing which includes at least image correction information which specifies the image correction processing, and outputting the file.

The imaging result processing method of the invention can reduce the time taken to present to the user the RAW data as the imaging result, in the form of the thumbnail image.

The invention also provides an image processing apparatus which processes a file of an imaging result which is obtained by an imaging apparatus, the imaging processing apparatus being characterized in that: the imaging apparatus includes: an image pickup element for outputting the imaging result which is an optical image formed on an imaging surface; an optical system for forming the optical image on the imaging surface; an analog-to-digital converting portion for converting the imaging result from analog to digital and outputting image data yet to be corrected; an image processing portion for subjecting the image data to an image correction processing and outputting the image data subjected to the image correction processing; a display portion for presenting an image of the image data subjected to the image correction processing; a pre-correction thumbnail-image-data generating portion for generating thumbnail image data yet to be corrected, by thinning the image data yet to be corrected; and a data outputting portion for creating a file of the imaging result from the image data yet to be corrected, the thumbnail image data yet to be corrected, and imaging information at the time of imaging-result capturing which includes at least image correction information which specifies the image correction processing by the image processing portion, and outputting the file, wherein the image processing apparatus includes: a data obtaining portion for obtaining the file of the imaging result; an image processing portion for generating corrected thumbnail image data corresponding to the image data subjected to the image correction processing, by correcting the thumbnail image data on the basis of the image correction information included in the file of the imaging result obtained by the data obtaining portion; and an image display portion for presenting an image of the corrected thumbnail image data, wherein the presentation of the image of the corrected thumbnail image data by the image display portion takes the form of presentation of a list of files of imaging results obtained by the data obtaining portion.

The image processing apparatus of the invention processes a file of an imaging result which is obtained by an imaging apparatus, and is characterized in that: the imaging apparatus includes: an image pickup element for outputting the imaging result which is an optical image formed on an imaging surface; an optical system for forming the optical image on the imaging surface; an analog-to-digital converting portion for converting the imaging result from analog to digital and outputting image data yet to be corrected; an image processing portion for subjecting the image data to an image correction processing and outputting the image data subjected to the image correction processing; a display portion for presenting an image of the image data subjected to the image correction processing; a pre-correction thumbnail-image-data generating portion for generating thumbnail image data yet to be corrected, by thinning the image data yet to be corrected; and a data outputting portion for creating a file of the imaging result from the image data yet to be corrected, the thumbnail image data yet to be corrected, and imaging information at the time of imaging-result capturing which includes at least image correction information which specifies the image correction processing by the image processing portion, and outputting the file, wherein the image processing apparatus includes: a data obtaining portion for obtaining the file of the imaging result; an image processing portion for generating corrected thumbnail image data corresponding to the image data subjected to the image correction processing, by correcting the thumbnail image data on the basis of the image correction information included in the file of the imaging result obtained by the data obtaining portion; and an image display portion for presenting an image of the corrected thumbnail image data, wherein the presentation of the image of the corrected thumbnail image data by the image display portion takes the form of presentation of a list of files of imaging results obtained by the data obtaining portion. Hence, the thumbnail image generated at the time when the imaging result is captured is effectively utilized in presenting the RAW data as the imaging result in the form of a list of thumbnail images. Thus, the time taken to present to the user the RAW data as the imaging result, in the form of the thumbnail image, is reduced.

The invention also provides an imaging result processing method for processing a file of an imaging result obtained by an imaging apparatus, the method being characterized in that: the file of the imaging result includes image data yet to be corrected which is to be presented and yet to be subjected to an image correction processing, thumbnail image data yet to be corrected which is obtained by thinning the image data yet to be corrected, and imaging information at the time of imaging-result capturing which includes at least image correction information specifying the image correction processing, the imaging result processing method includes: a data obtaining step for obtaining the file of the imaging result; an image processing step for generating corrected thumbnail image data corresponding to corrected image data which is obtained by subjecting the image data yet to be corrected to the image correction processing on the basis of the imaging information, by correcting the thumbnail image data, yet to be corrected, on the basis of the image correction information included in the file of the imaging result obtained in the data obtaining step; and an image presenting step for presenting an image of the corrected thumbnail image data, wherein the presentation of the image of the corrected thumbnail image data in the image presenting step takes the form of presentation of a list of files of imaging results obtained in the data obtaining step.

Hence, according to the imaging result processing method, the time taken to present to the user the RAW data as the imaging result, in the form of the thumbnail image, is reduced.

The invention also provides a program of an imaging result processing method for processing a file of an imaging result obtained by an imaging apparatus, the program being characterized in that: the file of the imaging result includes image data yet to be corrected which is to be presented and yet to be subjected to an image correction processing, thumbnail image data, yet to be corrected, obtained by thinning the image data yet to be corrected, and imaging information at the time of imaging-result capturing which includes at least image correction information specifying the image correction processing, the program of an imaging result processing method includes: a data obtaining step for obtaining the file of the imaging result; an image processing step for generating corrected thumbnail image data corresponding to corrected image data which is obtained by subjecting the image data, yet to be corrected, to the image correction processing on the basis of the imaging information, by correcting the thumbnail image data, yet to be corrected, on the basis of the image correction information included in the file of the imaging result obtained in the data obtaining step; and an image presenting step for presenting an image of the corrected thumbnail image data, wherein the presentation of the image of the corrected thumbnail image data in the image presenting step takes the form of presentation of a list of files of imaging results obtained in the data obtaining step.

Hence, according to the program of an imaging result processing method, the time taken to present to the user the RAW data as the imaging result, in the form of the thumbnail image, is reduced.

The invention also provides a recording medium storing a program of an imaging result processing method for processing a file of an imaging result obtained by an imaging apparatus, the recording medium being characterized in that: the file of the imaging result includes image data yet to be corrected which is to be presented and yet to be subjected to an image correction processing, thumbnail image data, yet to be corrected, obtained by thinning the image data yet to be corrected, and imaging information at the time of imaging-result capturing which includes at least image correction information specifying the image correction processing, the program of an imaging result processing method includes: a data obtaining step for obtaining the file of the imaging result; an image processing step for generating corrected thumbnail image data corresponding to corrected image data which is obtained by subjecting the image data yet to be corrected to the image correction processing on the basis of the imaging information, by correcting the thumbnail image data, yet to be corrected, on the basis of the image correction information included in the file of the imaging result obtained in the data obtaining step; and an image presenting step for presenting an image of the corrected thumbnail image data, wherein the presentation of the image of the corrected thumbnail image data in the image presenting step takes the form of presentation of a list of files of imaging results obtained in the data obtaining step.

Hence, according to the recording medium storing a program of an imaging result processing method, the time taken to present to the user the RAW data as the imaging result, in the form of the thumbnail image, is reduced.

The invention also provides an imaging result processing system which obtains and processes an imaging result, the system being characterized by including: an imaging apparatus for obtaining the imaging result; an image processing apparatus for processing the imaging result; the imaging apparatus including: an image pickup element for outputting the imaging result which is an optical image formed on an imaging surface; an optical system for forming the optical image on the imaging surface; an analog-to-digital converting portion for converting the imaging result from analog to digital and outputting image data yet to be corrected; an image processing portion for subjecting the image data to an image correction processing and outputting the image data subjected to the image correction processing; a display portion for presenting an image of the image data subjected to the image correction processing; a pre-correction thumbnail-image-data generating portion for generating thumbnail image data yet to be corrected, by thinning the image data; and a data outputting portion for creating a file of the imaging result from the image data yet to be corrected, the thumbnail image data yet to be corrected, and imaging information at the time of imaging-result capturing which includes at least image correction information which specifies the image correction processing by the image processing portion, and outputs the file; the image processing apparatus including: a data obtaining portion for obtaining the file of the imaging result; an image processing portion for generating corrected thumbnail image data corresponding to the image data subjected to the image correction processing which is obtained by correcting the image data, yet to be corrected, on the basis of the imaging information, by correcting the thumbnail image data, yet to be corrected, on the basis of the image correction information included in the file of the imaging result obtained by the data obtaining portion; and an image display portion for presenting an image of the corrected thumbnail image data, wherein the presentation of the image of the corrected thumbnail image data by the image display portion takes the form of presentation of a list of files of imaging results obtained by the data obtaining portion.

Hence, according to the imaging result processing system, the time taken to present to the user the RAW data as the imaging result in the form of the thumbnail image is reduced.

According to the invention, the time taken to present to the user the RAW data as the imaging result in the form of the thumbnail image is reduced.

BRIEF DESCRIPTION OF THE DRAWINGS

FIG. 5 is a plan view of a sub window of the display screen of FIG. 4.

FIG. 6 shows a flowchart illustrating a processing procedure related to presentation of the sub window of FIG. 5.

BEST MODE FOR CARRYING OUT THE INVENTION

Figure 1:
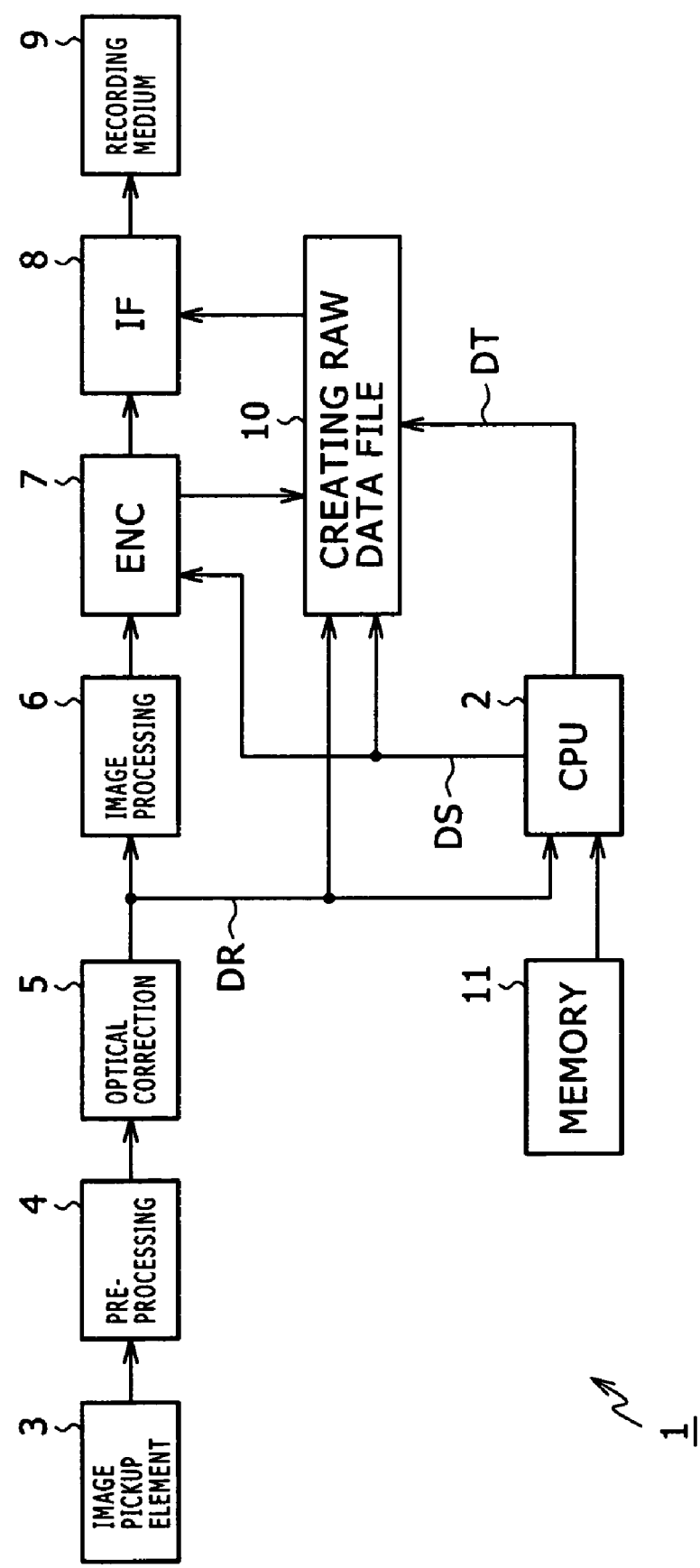
FIG. 1 is a block diagram of an electronic still camera according to one embodiment of the invention.

Hereinafter, there will be described one embodiment of the invention, by referring to the drawings, as needed.

(1) Structure of the Embodiment

FIG. 1 is a block diagram of an electronic still camera to which an electronic still camera system according to the embodiment of the invention is applied. The electronic still camera system implements an edit processing, by means of a computer, on a result of imaging by the electronic still camera 1.

In the electronic still camera 1, a lens (not shown) focuses incident light with the conditions of the imaging, e.g., aperture stop, zoom, and focus, being varied by control of a central processing unit (CPU) 2, and an optical image is formed on an imaging surface of an image pickup element 3 disposed adjacent to the lens.

The image pickup element 3 is provided by a CCD (Charge Coupled Device) solid-state image pickup device, a CMOS (Complementary Metal-Oxide Semiconductor) solid-state image pickup device, or others, and outputs a result of imaging, which is the optical image formed on the imaging surface, as an imaging signal.

A preprocessing circuit 4 subjects the imaging signal outputted from the image pickup element 3, to a correlation double sampling processing, a processing of correcting a signal level by auto gain adjustment, and an analog-digital converting processing, thereby generating image data of the imaging result. Further, the preprocessing circuit 4 outputs the image data with a sampling phase thereof corrected depending on a color filter disposed in the image pickup element 3.

An optical correction circuit 5 implements an error correction processing on the image data outputted from the preprocessing circuit 4, and outputs the image data as RAW data DR.

An image processing circuit 6 receives the RAW data DR as the image data, and sequentially subjects the RAW data DR to image correction processings such as a resolution converting processing, a gamma correction processing, a white balance adjustment processing, and an image adjustment processing, and outputs the image data having thus been corrected. The electronic still camera 1 presents the corrected image data outputted from the image processing circuit 6, on a display device (not shown), so as to present a monitor image of the imaging result.

An encoder (ENC) 7 compresses the image data outputted from the image processing circuit 6, for instance into JPEG (Joint Photographic Coding Experts Group) format. The ENC 7 further generates a thumbnail image from the image data and compresses the thumbnail image, and outputs a result of these processings in EXIF format. The ENC 7 is controlled by the CPU 2 to switch its operation to output the compressed thumbnail image data to a RAW-data-file creating circuit 10.

An interface (IF) 8 records the data outputted from the ENC 7 on a recording medium 9. The IF 8 is controlled by the CPU 2 to switch its operation to record on the recording medium 9 data of the RAW data file outputted from the RAW-data-file creating circuit 10. The IF 8 also displays data recorded on the recording medium 9 and outputs it to various portions.

In this embodiment, the recording medium 9 is a memory card, and stores various kinds of data outputted from the IF 8. It is noted that the recording medium 9 is not limited to a memory card, but a wide range of recording media, such as optical disk and magnetic disk, can be used as the recording medium 9.

The RAW-data-file creating circuit 10 generates a RAW data file from the RAW data DR outputted from the optical correction circuit 5, thumbnail image data DT outputted from the CPU 2, imaging information DS at the time of imaging-result capturing, and others, and outputs data of the RAW data file to the IF 8. The thumbnail image data DT is image data of a thumbnail image generated by thinning the RAW data DR. The imaging information DS at the time of imaging-result capturing is information on the conditions set in the electronic still camera 1 when the RAW data was captured by imaging, and constituted by image correction information specifying the image correction processings implemented by the image processing circuit 6, information on an optical system that specifies settings of the lens and the image pickup element 3, and others. More specifically, the image correction information specifies a correction to the hue, gradation, frequency characteristic, and others of the RAW data DR by the image processing circuit 6, and is constituted by information on image correction mode (color mode), for instance. On the other hand, the information on the optical system is constituted by information on the shutter speed, focal length, and aperture stop, for instance.

Figure 2:
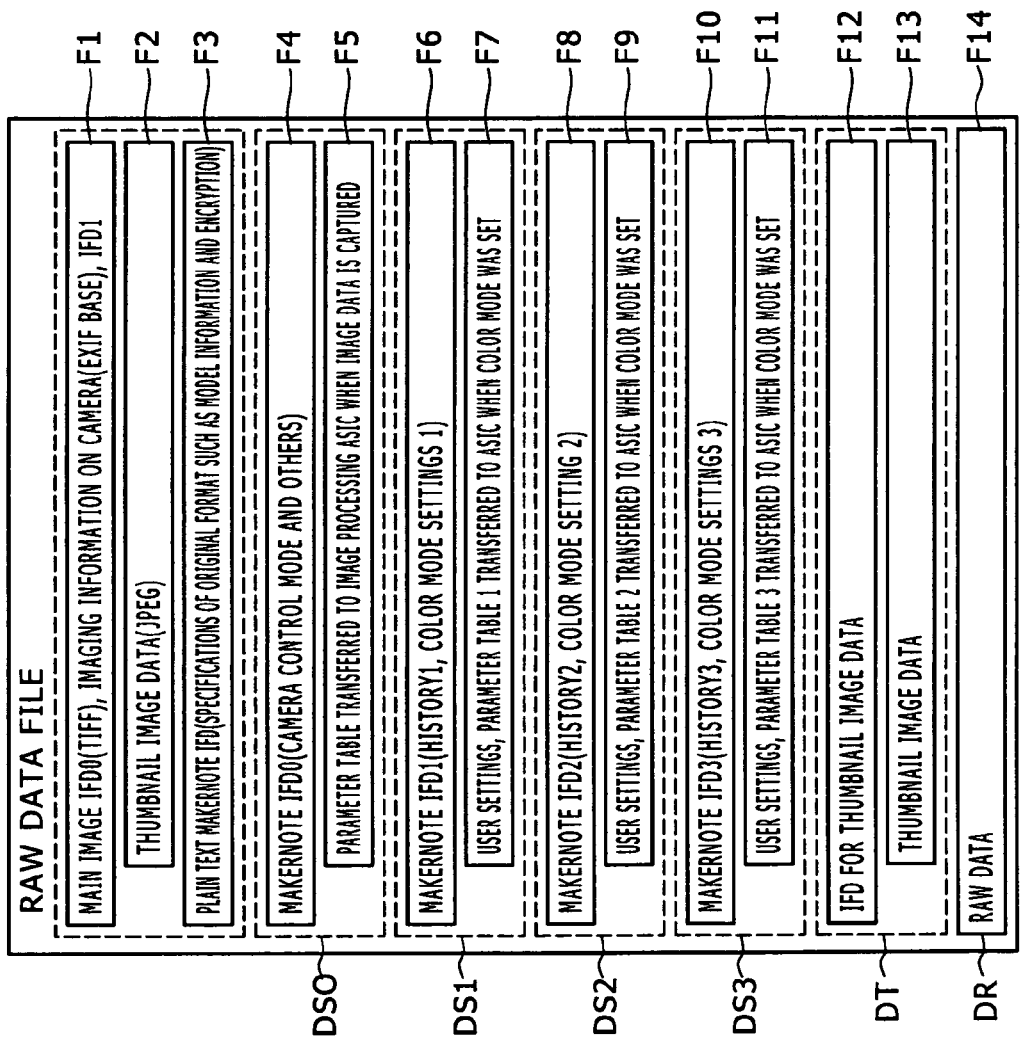
FIG. 2 is a diagram of a file format of the electronic still camera of FIG. 1.

The RAW data file is a file storing the RAW data in a format compliant with EXIF, as shown in FIG. 2. Like an EXIF file, the RAW data file has a header where various kinds of data are allocated as IFD (Image File Directory).

In a first field F1 of the RAW data file are recorded information (main image data IFD0) necessary for displaying main image data, and various kinds of information (imaging information) at the time the main image data is captured by imaging. In this embodiment, the RAW data DR is assigned to the main image data. To the various kinds of information at the time the main image data is captured by imaging, there are assigned information specifying the electronic still camera 1 used for capturing the image data, and the information on the conditions set when the RAW data was captured. More specifically, among various kinds of information defined by EXIF, the ones that correspond thereto are assigned. That is, information of the aperture stop, focal length, shutter speed, and others, information on the image correction mode and others of the image processing circuit 6, and other kinds of information defined in EXIF such as filename and user name are assigned.

To a second field F2 of the RAW data file, the thumbnail image data that is JPEG-compressed is allocated. In a third field F3, information (plain text makernote IFD) defined by a maker of the electronic still camera 1 is recorded. Since the first three fields F1-F3 are in EXIF format, the RAW data assigned to the main image data is displayable by various application programs that can process an Exif file.

To the next two fields, F4 and F5, of the RAW data file are allocated imaging information DS0 at the time of capturing the main image data as the imaging result. More specifically, in this embodiment, settings of the electronic still camera 1 at the time the RAW data was obtained by imaging, such as those of the aperture stop (e. g., 0EV or −1EV), shutter speed, and imaging mode, are recorded in the precedent field F4, and specific parameters of the settings recorded in the field F4 are recorded in the subsequent field F5. For instance, with regard to aperture stop, "0EV" is recorded in the precedent field F4 and a specific aperture value "5", "6" or other values is recorded in the subsequent field F5. With regard to the image correction mode, an auto white balance adjusting mode and a portrait imaging mode are recorded in the precedent field F4, for instance, and a gain for each color signal in the auto white balance adjusting mode and a parameter in a color correction depending on the imaging mode are recorded in the subsequent field F5, for instance.

In the following fields F6-F11 of the RAW data file, there is set an areas where a predetermined number of pieces of similar imaging information are recordable. In this specific RAW data file, imaging information DS1-DS3 of edit processings are recorded in this area. Each imaging information DS1-DS3 of an edit processing is imaging information that is set at the time an edit processing is implemented, and corresponds to the imaging information DS0 at the time of imaging-result capturing. Each imaging information DS1-DS3 is such that history information is added to information corresponding to the imaging information DS0 at the time of capturing the main image data. Each piece of imaging information is divided into two parts that are allocated to respective fields in the same way as the imaging information DS0 of the main image data is, and the imaging information DS1-DS3 are sequentially assigned to the fields F6-F11. The history information is information at the time the imaging information DS1-DS3 is set in the RAW data file.

To the subsequent field F12 of the RAW data file, information necessary for displaying the thumbnail image data DT is allocated. To the subsequent field F13, the thumbnail image data DT is allocated. To the last field F14, the RAW data as the main image data is allocated.

The RAW data constitutes about 95% of the entire data of the RAW data file. Since such RAW data is allocated to the last field of the file, processing the thumbnail image data using the imaging information DS0 and the imaging information DS1-DS3 of edit processings is possible by replaying about 5% of the file from top.

On receiving an instruction from the CPU 2 to record an imaging result in the form of RAW data file, the RAW-data-file creating circuit 10 generates data of a RAW data file in the format shown in FIG. 2, on the basis of RAW data DR outputted from the image processing circuit 6, imaging information DS and thumbnail image data DT outputted from the CPU 2, thumbnail image data in JPEG format generated in the ENC 7, and others, and outputs the data of the RAW data file to the IF 8.

The CPU 2 is a control portion which controls a general operation of the electronic still camera 1 according to a processing program recorded in a memory 11. In this embodiment, the processing program is installed in the electronic still camera 1 in advance. However, instead of installation in advance, the processing program may be provided by downloading via a network such as Internet, or alternatively through a recording medium such as optical disk, magnetic disk, and memory card.

When a user instructs to obtain the imaging result by this processing procedure, the CPU 2 controls the image pickup element 3, the preprocessing circuit 4, and the optical correction circuit 5 to obtain the imaging result under the conditions instructed by the user, including conditions of the aperture stop and shutter speed, and stores the RAW data DR in a memory (not shown). Further, the CPU 2 controls the image processing circuit 6 to generate corrected image data by correcting the imaging result in the form of RAW data DR to a quality as instructed by the user, and presents a monitor image of the corrected image data on the display device.

When the user instructs to record the obtained imaging result, the CPU 2 controls an overall operation in order to record the imaging result on the recording medium 9. At this time, when the user instructs to record the imaging result in EXIF file format, the CPU 2 controls the ENC 7 and the IF 8 to JPEG-compress the corrected image data outputted from the image processing circuit 6, and record the image data on the recording medium 9 in EXIF file format.

On the other hand, when the user instructs to record the imaging result in the form of RAW data DR, the CPU 2 processes the RAW data DR stored in the memory to generate thumbnail image data DT. That is, the CPU 2 generates the thumbnail image data DT by thinning the RAW data DR in a vertical and a horizontal direction. More specifically, according to this embodiment, the thumbnail image data DT is generated by a sampling method such that the CPU 2 selects one area from five consecutive areas as a unit, in each of the vertical and horizontal directions. Hence, in the generation of the thumbnail image data DT by the CPU 2, the thinning rate is 1/5. Further, a lowpass filter is beforehand used to decrease the resolution in the horizontal and vertical directions, thereby preventing occurrence of a false signal during the thinning process. The processing by means of the lowpass filter is implemented by an operation of the following expression: $(1 \times d1 + 2 \times d2 + 2 \times d3 + 1 \times d4)/8$,, where d1-d4, represent the consecutive sampling values.

The CPU 2 further controls the ENC 7 to generate the thumbnail image data DT from the corrected image data, and generates imaging information DS at the time of capturing the main image data, from the settings of the various portions at the time the RAW data DR is captured. The CPU 2 outputs the imaging information DS, the thumbnail image data DT, the thumbnail image data DT from the ENC 7, and others, to the RAW-data-file creating circuit 10, and controls the RAW-data-file creating circuit 10 and the IF 8 to record the RAW data DR on the recording medium 9 in the form of the above-described RAW data file.

At this time, the CPU 2 controls the operation of the RAW-data-file creating circuit 10 such that meaningless information, such as dummy data, is set in the fields F6-F11 of the imaging information DS1-DS3 of edit processings.

On the other hand, when the user instructs to delete the imaging result while the imaging result obtained is stored in the memory, the CPU 2 deletes the RAW data DR stored in the memory, and presentation of the imaging result on a display portion is canceled.

When the user switches the operation mode and instructs to display an imaging result recorded on the recording medium 9, the CPU 2 accesses the recording medium 9 via the IF 8 and presents a list of files recorded on the recording medium 9 as a menu presenting the files by their file names or others that were set when the files were recorded. When the user selects a file from this menu, the CPU 2 opens the selected file from the recording medium 9 to present it on the display portion. In this processing, when the file that the user selects to open is an EXIF file, the CPU 2 presents as the imaging result the thumbnail image set in the EXIF file. On the other hand, when the file the user selects to open is a RAW data file, the CPU 2 presents as the imaging result the compressed thumbnail image data set in the top portion of the RAW data file.

Figure 3:
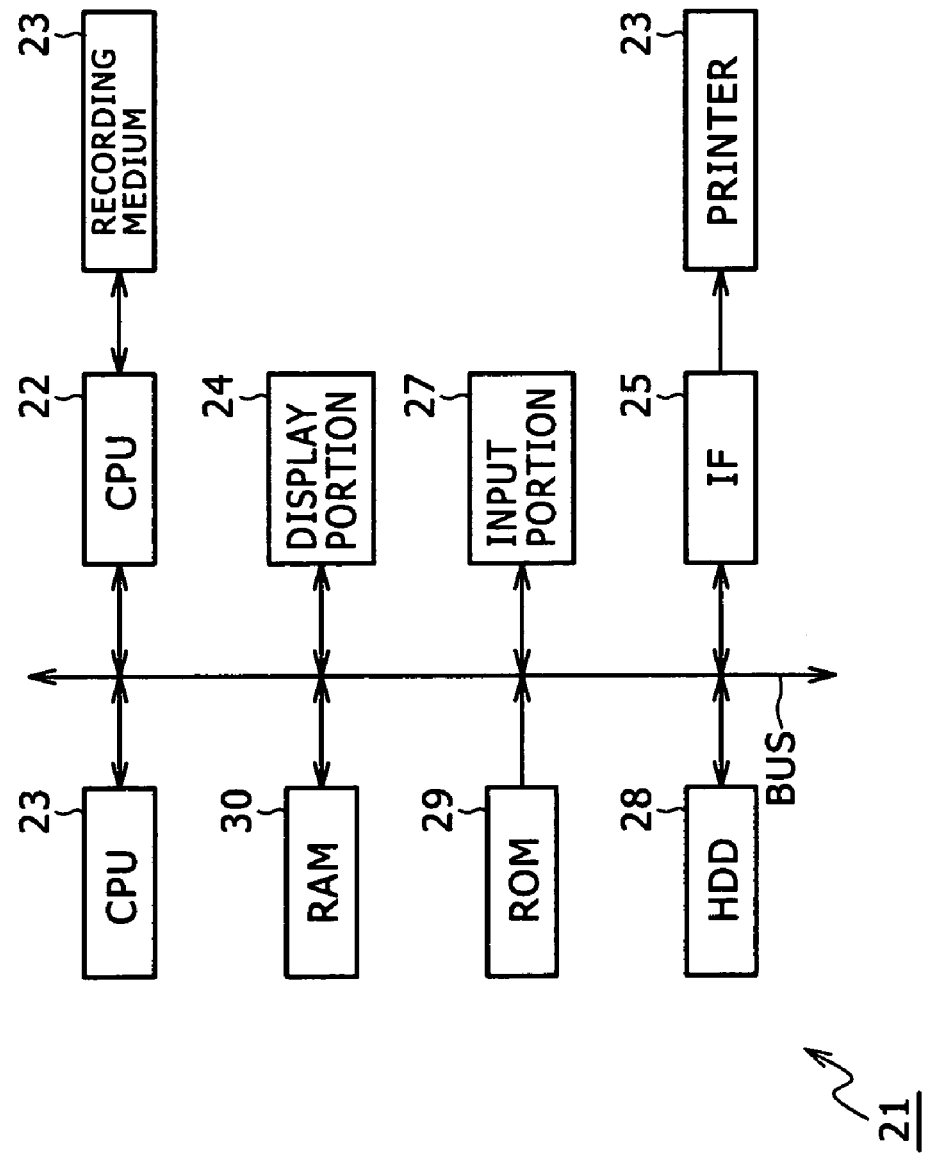
FIG. 3 is a block diagram of a structure of a computer that processes a result of imaging by the electronic still camera of FIG. 1.

FIG. 3 is a block diagram of the computer related to the processing of the imaging result recorded on the recording medium 9. In the computer 21, an interface (IF) 22 replays data recorded on the recording medium 9 and outputs the data to a bus BUS under control by a CPU 23, or records data as outputted to the bus BUS, on the recording medium 9.

The display portion 24 presents various kinds of images under control by the CPU 23, and an interface (IF) 25 outputs to a printer 26 various kinds of data necessary for performing printing under control of the CPU 23. An input portion 27 is constituted by a keyboard, a mouse, and others, and communicates a manipulation by the user to the CPU 23. A hard disk drive (HDD) 28 stores programs of various processings implemented by the CPU 23, and data.

The programs stored in the hard disk drive 28 are provided by being recorded on a recording medium such as optical disk, magnetic disk, and memory card. However, instead of being recorded on a recording medium, the programs may be provided by being installed beforehand, or by being downloaded via a network such as Internet.

The CPU 23 is an arithmetic processing portion of the computer 21, and uses a portion of a random access memory (RAM) 30 as a work area to boot up an operating system stored in the hard disk drive 28 in accordance with data recorded on a read only memory (ROM) 29. In response to a manipulation by the user in the operating system, the CPU 23 downloads an imaging result recorded on the recording medium 9 to a folder designated by the user.

In accordance with an instruction of the user detected by the input portion 27, the CPU 23 activates a program (hereinafter referred to as "edit program") according to which an edit processing is implemented on the imaging result recorded on the hard disk drive 28. In the following description of a series of processings implemented by the CPU 23, it is assumed that only files of the above-described RAW data file format are recorded on the recording medium 9.

Figure 4:
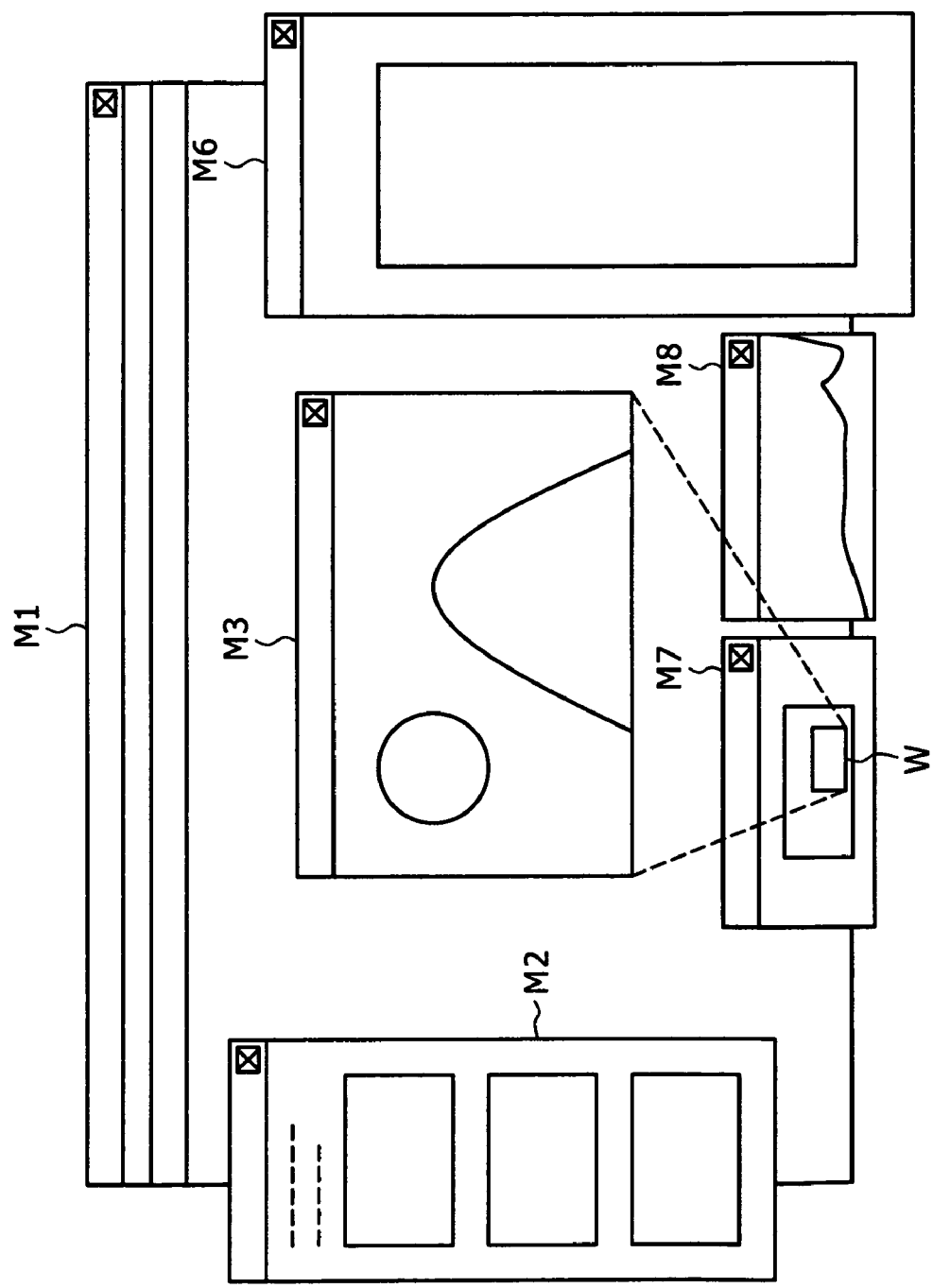
FIG. 4 is a plan view of a display screen of an edit program of the computer of FIG. 3.

With the activation of the edit program, the CPU 23 presents a main screen Ml of the edit program as shown in FIG. 4. When an option is selected from a menu presented on the main screen M1, a sub menu is presented in the form of a pull-down menu from which the user can select an option.

When the user instructs to present a folder or a list of imaging results recorded on the recording medium 9 by selecting an option from the sub menu, the CPU 23 obtains information on the folder designated by the user or the files recorded on the recording medium 9, from the folder or a file management system of the recording medium 9, selects files that are able to be processed by the edit result program, and presents thumbnail images of the selected files by a list on a sub window M2.

FIG. 5 (A) is a plan view of the sub window M2 related to the presentation of the list. At the top of the sub window M2 is presented a title bar, under which a location where the files are stored is presented. Further, under the presentation of the location are presented a slide button enabling to manipulate the display, and others, under which the thumbnail images are sequentially presented. The CPU 23 presents the thumbnail images by the processing procedure illustrated in FIG. 6.

That is, when the user instructs to present the list, the flow of the processing by the CPU 23 proceeds from step SP1 to step SP2 to obtain data of the corresponding files by accessing the recording medium 9 or the folder. In this step, the CPU 2 observes the file data sequentially obtained in order to cease the data acquisition when the thumbnail image data DT obtained by thinning the RAW data, and information related to an image processing on the RAW data, are obtained, and does not obtain the rest of the file. More specifically, the CPU 23 operates to obtain data of the RAW data file from the first field F1 to the field F13 where the thumbnail image data DT is allocated, but then the CPU 23 stops the data acquisition and does not obtain the data of the following fields.

Subsequently, the processing flow goes to step SP3 in which the CPU 23 analyzes IFD of the obtained data, and further expands and distributes the obtained data. By this expanding and distributing processing, the CPU 23 obtains from the obtained data the thumbnail image data DT set in the field F13, and the information necessary to display the thumbnail image data DT set in the field F12. Further, the CPU 23 obtains the imaging information DS0 at the time of imaging-result capturing and the imaging information DS1-DS3 of edit processings, depending on the settings made by the user in advance.

In the following step SP4, the CPU 23 corrects the thumbnail image data DT obtained in step SP3 on the basis of the image correction information set in the imaging information DS0 at the time of imaging-result capturing, thereby generating thumbnail image data of the image quality as that of the image presented when the image data was captured. More specifically, the CPU 23 restores the settings of the image processing circuit 6 at the time the main image data was captured, on the basis of the image correction information related to the settings of the image processing circuit 6 that are set in this imaging information DS0, and corrects the thumbnail image data DT by a gamma correction and a white balance adjustment and further adjusts the gradation, hue, frequency characteristic, and others, under the restored settings. The CPU 23 records an image of the thus adjusted thumbnail image data DT in an image memory for display.

Then, the processing flow goes to step SP5 in which the CPU 23 determines whether all the thumbnail images to be presented on the sub window M2 have been obtained. When a negative decision is obtained in step SP5, the processing flow goes back to step SP2, and begins to process a next file. On the other hand, when an affirmative decision is obtained in step SP5, the processing flow goes to step SP6 in which the CPU 23 presents the sub window M2 with the images recorded in the image memory. By the processings of steps SP2-SP6 shown in FIG. 6, the CPU 23 presents, in the form of a list of thumbnail images, the imaging results recorded on the recording medium 9 or downloaded to the computer 21, and then the processing flow goes to step SP7 to terminate the processing procedure.

The series of processings described with respect to FIG. 6 is implemented in a case where the imaging information DS1-DS3 of edit processings are not recorded in the RAW data file as an object of processing. In this case, the CPU 23 processes the thumbnail image data DT on the basis of the imaging information DS0 related to the settings at the time of imaging-result capturing, to present a list of the imaging results at the time of capturing thereof.

On the other hand, in a case where the imaging information DS1-DS3 of edit processings are recorded, the CPU 23 selects one of the imaging information DS1-DS3 that is most recently recorded, on the basis of the history information set in the imaging information DS1-DS3 of edit processings, in step SP4. The CPU 23 processes the thumbnail image data DT by using the selected one of the imaging information DS1-DS3 of edit processings in place of the imaging information DS0 at the time of imaging-result capturing, and presents the imaging result subjected to the edit processing, in the form of a thumbnail image.

Instead of processing the thumbnail image data DT by selecting the most recent imaging information DS1-DS3, the thumbnail image data DT may be processed on the basis of each of the imaging information DS0 related to the settings at the time of imaging-result capturing and the imaging information DS1-DS3 recorded in the RAW data file, so that a plurality of thumbnail images are presented for one RAW data file. Alternatively, one of the imaging information DS0-DS3 may be selected in accordance with a setting or an instruction made by the user and used in the processing of the thumbnail image data.

In the processing of the list presentation, where the user does not input any particular instruction regarding the form of the list presentation, the CPU 23 presents a list of the imaging results in the form of thumbnail images, as shown in FIG.

5(A). On the other hand, where the user instructs to present a histogram by making a setting in advance or by switching the display mode of the list presentation, the CPU 23 detects a gradation distribution of a color signal in each imaging result from the thumbnail image thereof, and presents a histogram of the gradation distribution along with the thumbnail image, as shown in FIG. 5(B) (referring to FIG. 7).

Figure 7:
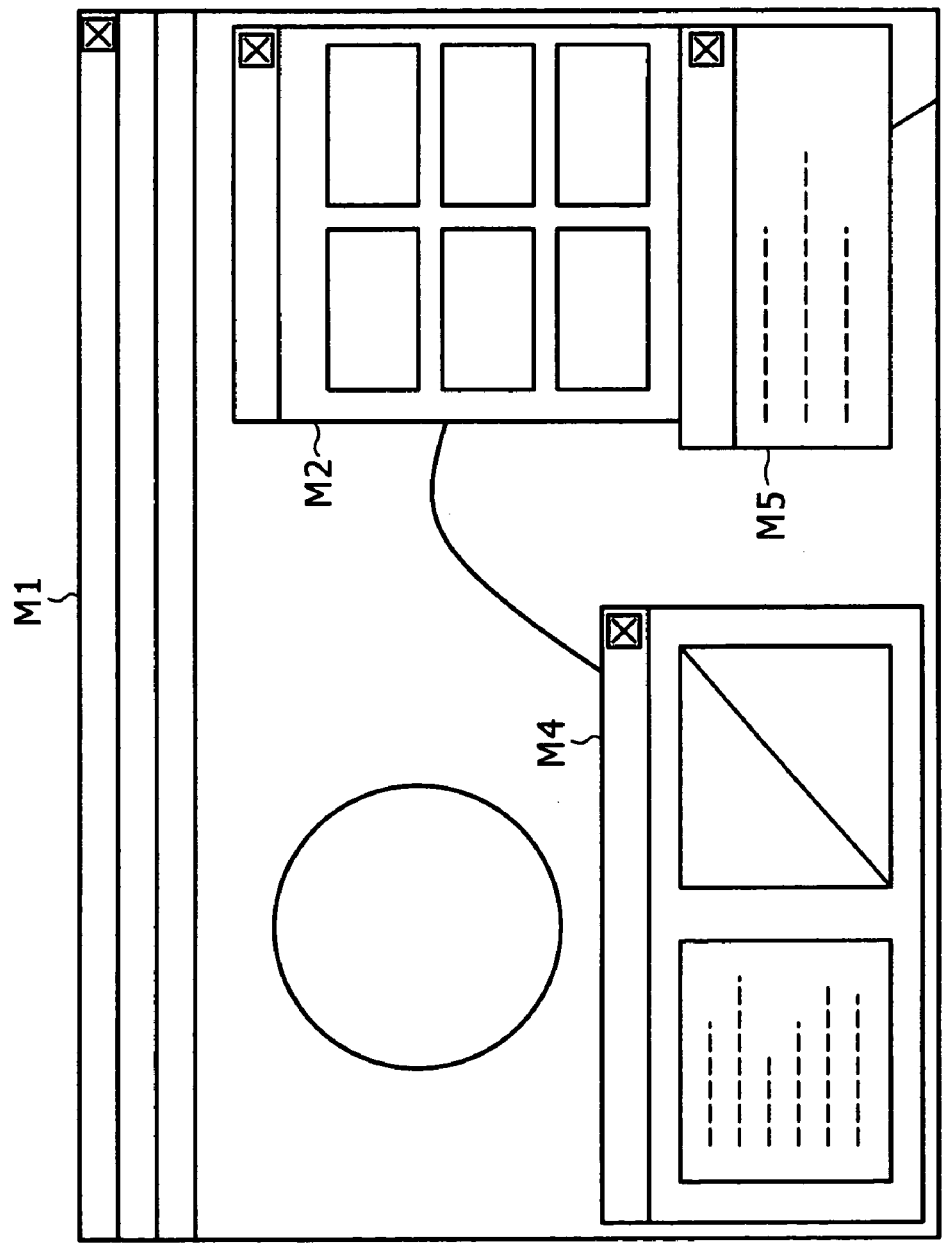
FIG. 7 is a plan view of a presentation of the imaging result on the display screen of FIG. 3.

The CPU 23 presents the imaging results in the form of a list of thumbnail images, and the user selects one of the thumbnail images. Then, the CPU 23 presents a sub window M3 on the main screen M1, on which M3 a corresponding imaging result is presented (FIG. 3). When the user manipulates to change the size of the sub window M3, the corresponding imaging result is presented in the changed size in response to the manipulation of the user. When presentation in full-screen is instructed in the sub window M3, the corresponding imaging result is presented on the main screen M1 in full-screen, as shown in FIG. 7. The CPU 23 implements the full-screen presentation of the imaging result by presenting the thumbnail image in enlargement, thereby enhancing the user-friendliness.

Figure 8:
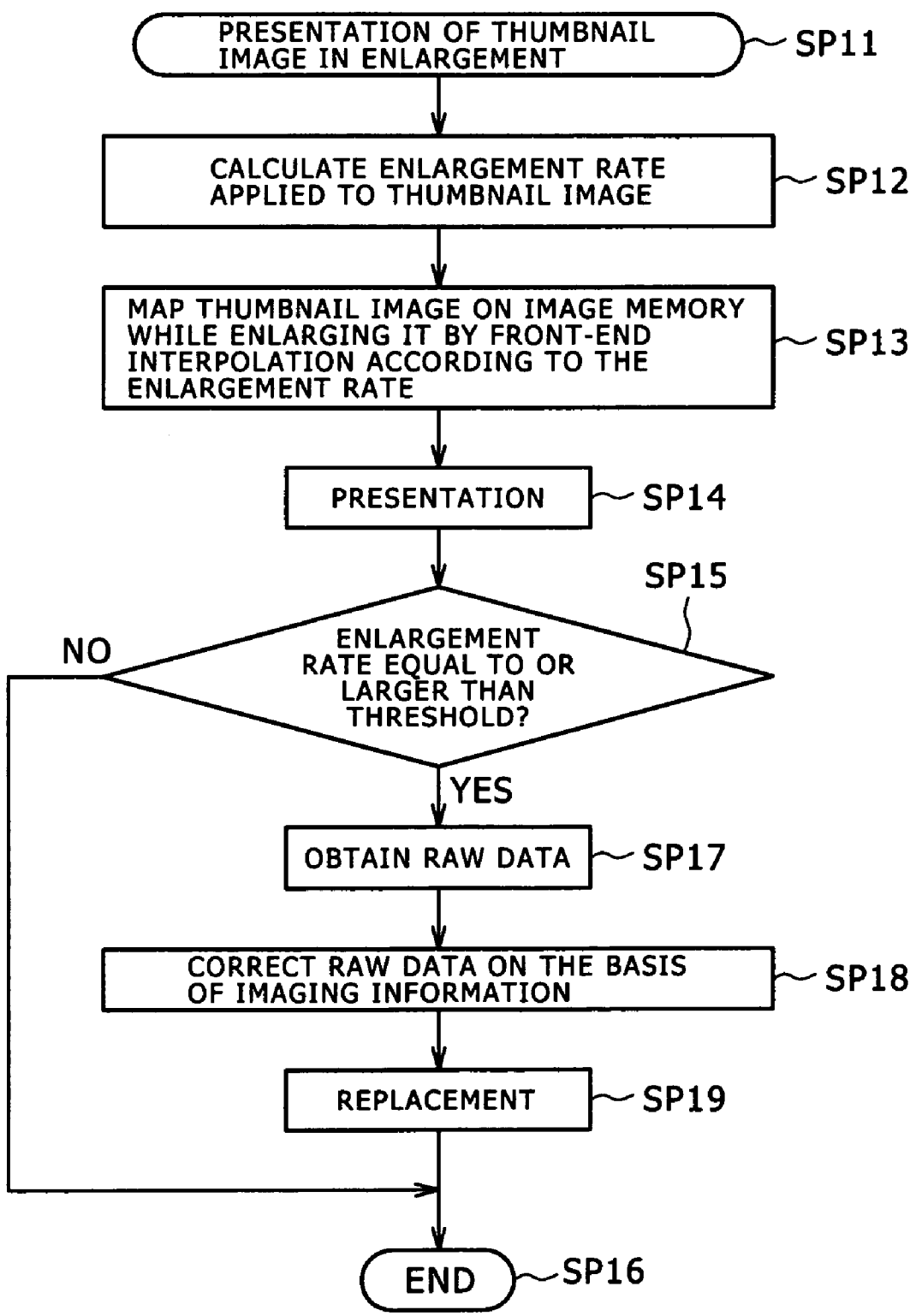
FIG. 8 shows a flowchart illustrating a processing procedure related to the presentation of the imaging result shown in FIG. 7.

FIG. 8 shows a flowchart illustrating a processing procedure implemented by the CPU 23 for presenting the imaging result in full-screen. With the start of the processing procedure, the flow proceeds from step SP11 to step SP12 in which the CPU 23 calculates an enlargement rate, at which an image based on the thumbnail image data DT is enlarged when the image is presented on each of the sub window M3 and the main screen M1, by comparing the size of the thumbnail image based on the thumbnail image data and the size of a presentation area of each of the sub window M3 and the main screen M1. In the following step SP13, the thumbnail image used for the list presentation is enlarged and mapped on the image memory by front-end interpolation corresponding to the enlargement rate obtained in step SP12. In the following step SP14, the thumbnail image for presentation in enlargement that is mapped on the image memory is presented on the main screen M1 and the sub window M3. The CPU 23 initially presents on the basis of the thumbnail image data of a low resolution on the main screen M1 and the sub window M3 the imaging result, by the processings of steps SP12-SP14.

After the thumbnail image is thus presented in enlargement, the processing flow goes to step SP15 in which the CPU 23 determines whether the enlargement rate is equal to or larger than a predetermined threshold, in order to determine whether replacing the thumbnail image presented in enlargement with the image based on the RAW data DR enhances the quality of the image presented. When a negative decision is obtained in this step, the processing flow proceeds from step SP15 to step SP16 in which the CPU 23 terminates this processing procedure.

On the other hand, when an affirmative decision is obtained in step SP15, the processing flow proceeds from step SP15 to step SP17 in which the CPU 23 obtains the RAW data DR from the RAW data file of the thumbnail image presented in enlargement. In the following step SP18, the CPU 23 corrects the RAW data DR on the basis of the imaging information of the thumbnail image currently presented in enlargement, and changes the resolution in order to match the image to be presented with the size of the area in which the image is to be presented.

In step SP19, the CPU 23 presents the image of the RAW data DR having been processed in step SP18 in substitution for the thumbnail image currently presented in enlargement. Then, the processing flow goes to step SP16 to terminate this processing procedure.

The processings of steps SP15-SP19 after the presentation of the thumbnail image in enlargement in step SP14 are implemented by the CPU 23 as so-called background processings that are implemented during the system is unoccupied. By the presentation in enlargement in step SP14, the CPU 23 presents the imaging result in response to a manipulation of the user in a reduced time, thereby enhancing the user-friendliness. By implementing the processings of steps SP15-SP19 as background processings after the presentation of the imaging result in the form of the presentation of the thumbnail image in enlargement, the image quality of the imaging result presented in enlargement is improved without impeding various kinds of processings instructed by the user. When the user instructs to terminate the presentation of the imaging result during implementation of steps SP15-SP19, the CPU 23 immediately terminates the processing procedure shown in FIG. 8.

Figure 9:
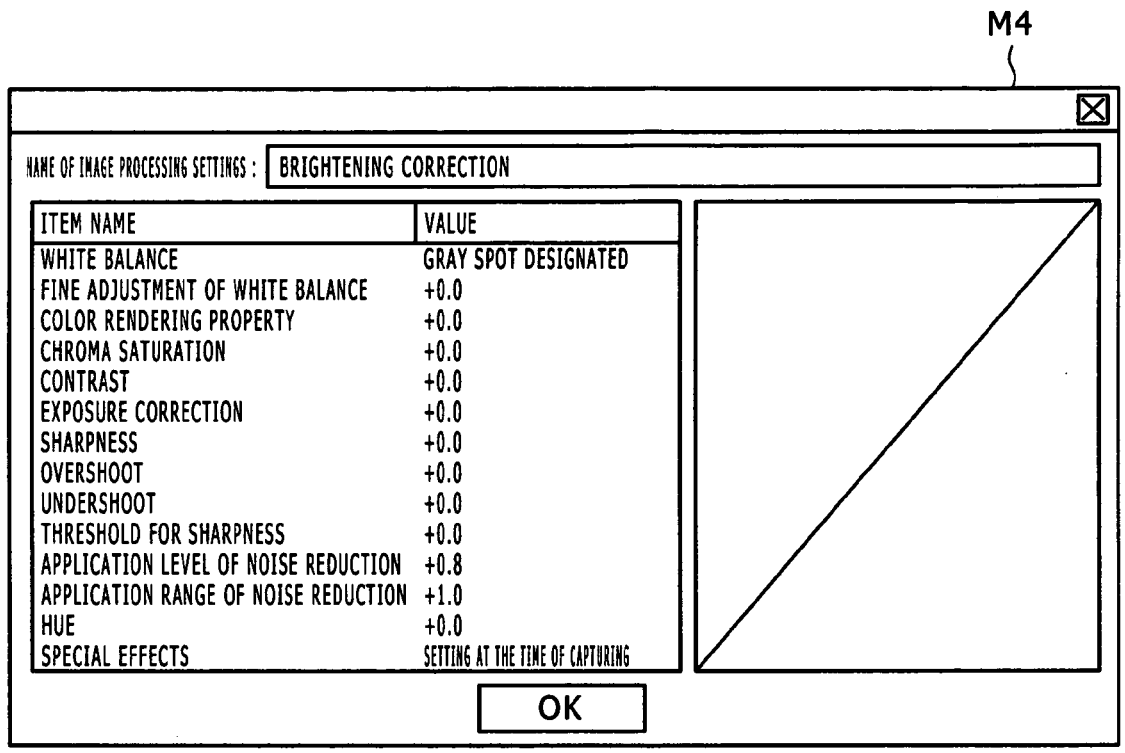
FIG. 9 is a plan view of a presentation of imaging information.

In the presentation of the list of the thumbnail images, when the user selects a thumbnail image and instructs to present imaging information DS0-DS3 used in presenting the selected thumbnail image, a sub window M4 is displayed in which the imaging information DS0-DS3 is presented, as shown in FIG. 9. A gamma characteristic is presented in the form of a characteristic curve in a right-hand portion of the sub window M4, and items of the imaging information are presented in a left-hand portion thereof. In this embodiment, the items include white balance adjusting mode, an amount of fine-adjustment of white balance, an amount of adjustment of color rendering property, an amount of adjustment of chroma saturation, and an amount of adjustment of contrast. These adjustment amounts are presented in the form corresponding to a user interface through which settings are made in the electronic still camera 1. To the imaging information DS0-DS3 of the RAW data file are assigned the kinds of information presented on the sub window M4.

Figure 10:
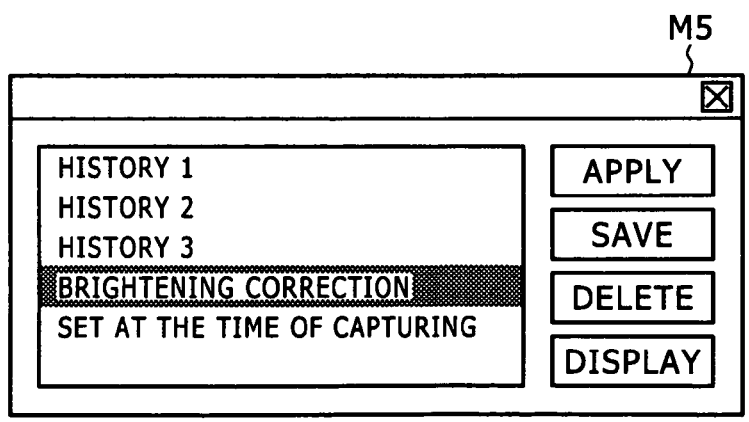
FIG. 10 is a plan view of a presentation of sorts of the imaging information.

As shown in FIG. 10, at this time a sub window M5 is presented to further present sorts of the imaging information DS0-DS3 set in the RAW data file of the thumbnail image selected by the user. In the example shown in FIG. 10, "Set at the time of capturing of the image data" indicates the imaging information DS0 at the time of imaging-result capturing. Each of "History 1", "History 2", and "History 3" indicates the imaging information DS1-DS3 of an edit processing, i.e., imaging information recorded at the time an edit processing (described later) is implemented by the computer 21. "Brighter correction" indicates imaging information similarly recorded at the time when an edit processing was implemented by the computer 21, but with a title assigned by the user.

Figure 11:
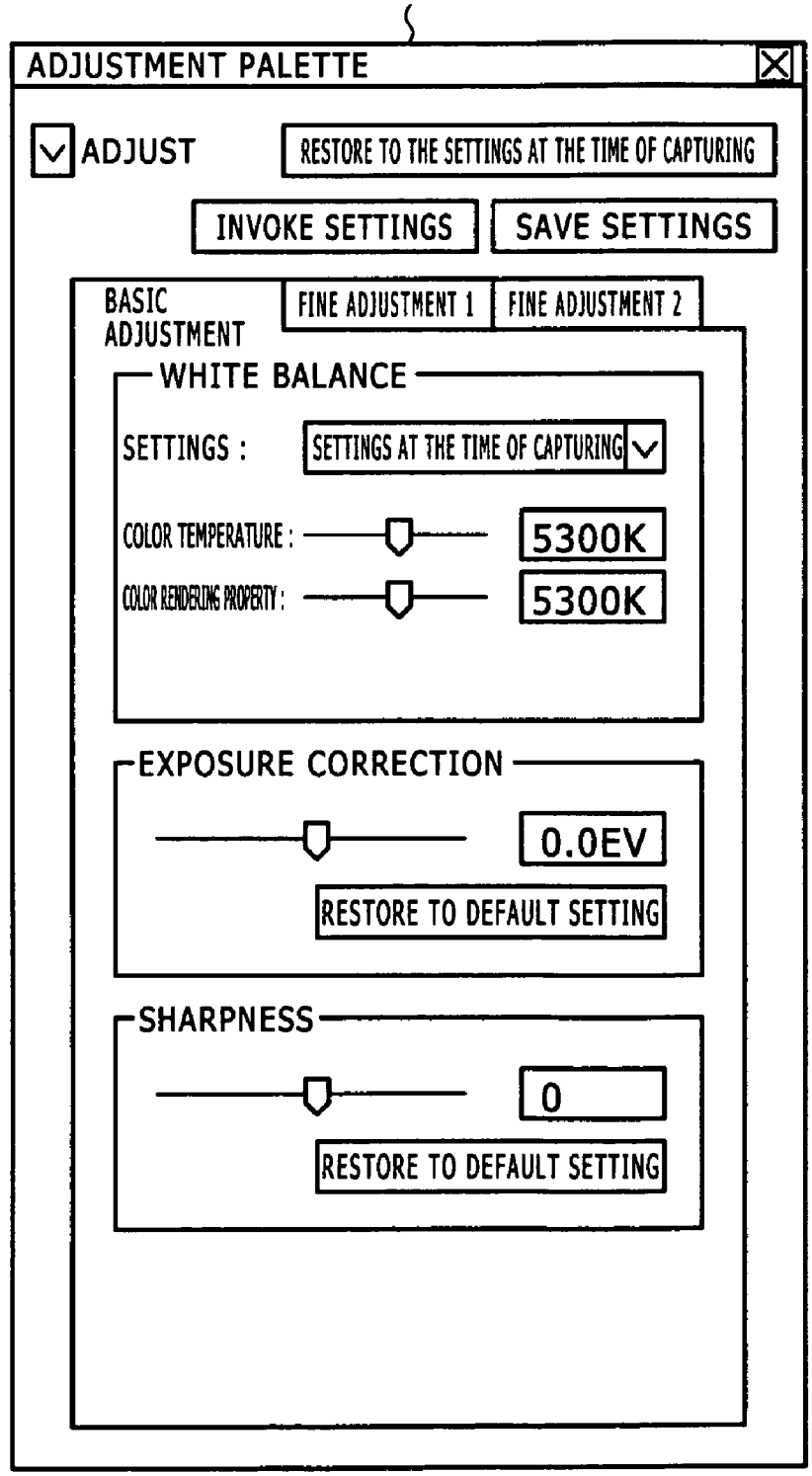
FIG. 11 is a plan view for explaining an edit processing.

On the other hand, in the presentation of the list of thumbnail images, when the user selects an imaging result and instructs to edit the imaging result, or when the user instructs to edit an imaging result presented on the main screen M1 and the sub window M3, the CPU 23 presents an edit screen shown in FIG. 11 in a sub window M6.

In the sub window M6, image quality adjustment items are sorted out into a plurality of groups, and each group is presented in one adjustment screen with a tab. In the adjustment screen of each group, each adjustment item is presented such that the adjustment amount thereof is settable in an operation amount corresponding to the user interface through which settings are made in the electronic still camera 1. In a specific example of FIG. 11, buttons for adjustments of color temperature and color rendering property are presented along with their adjustment values, with the settings at the time of imaging-result capturing being used as reference, and buttons for adjustments of exposure compensation and sharpness are also presented along with their adjustment values.

At the same time, the CPU 23 presents the imaging result on a preview screen in a sub window M7 (FIG. 4). Further, in response to an instruction by the user, the CPU 23 presents in a sub window M8 results of various kinds of analysis of the imaging result presented on the preview screen. The presentation of the results of the analysis include the presentation of the histogram of the gradation distribution of each color signal as described above with respect to FIG. 5(B), and presentation of a histogram of a gradation distribution of luminance as shown in FIG. 4.

The CPU 23 implements the presentation of the preview screen and the results of the analysis on the basis of the thumbnail image data. The CPU 23 switches the display of the sub window M6 when one of the tabs is selected in the sub window M6, and accepts input of a setting for each adjustment item. At this time, the CPU 23 changes the image quality of the preview screen according to the adjustment amounts changed by the user.

That is, when the user changes an adjustment amount in the sub window M6, the CPU 23 corrects the imaging information related to the presentation of the preview screen, according to the changed adjustment amount. The thumbnail image data is corrected on the basis of the corrected imaging information, and an image obtained as a result of this processing is presented for preview. By processing the thus corrected image data, information necessary for the presentation of the results of the analysis is obtained, and the presentation of the sub window M8 is changed on the basis of the thus obtained information.

The CPU 23 implements the preview processing in response to manipulations of the user. When a check box "Adjust" that is presented at the top of the sub window M6 is checked by the user, the CPU 23 changes the image quality of the imaging result in the sub window M3 and the image quality of the imaging result presented in full screen in the main window M1, as well as the image quality of the image on the preview screen, according to the change in the image quality of the preview screen made through the sub window M6. Where the user instructs to present in enlargement a particular area in the preview screen at this time, a frame W delimiting the particular area is presented on the preview screen, and the particular area is presented in enlargement, as a presentation of the imaging result in the sub window M3 or as a full-screen presentation of the imaging result in the main screen M1, with a broken line indicating this relationship, as shown in FIG. 4.

In these cases also, the CPU 23 initially presents the imaging result having been subjected to the edit processing, in the form of a thumbnail image, in the sub window M3 or the main screen M1. Hence, the imaging result having been subjected to the edit processing can be presented in a short time in response to a manipulation by the user, thereby enhancing the user-friendliness. Further, after presenting the imaging result having been subjected to the edit processing in the form of the enlarged thumbnail image, the CPU 23 implements the edit processing on the RAW data and replaces the currently presented thumbnail image with the RAW data having been subjected to the edit processing to improve the image quality of the presented imaging result, without impeding various processings instructed by the user.

Figure 12:
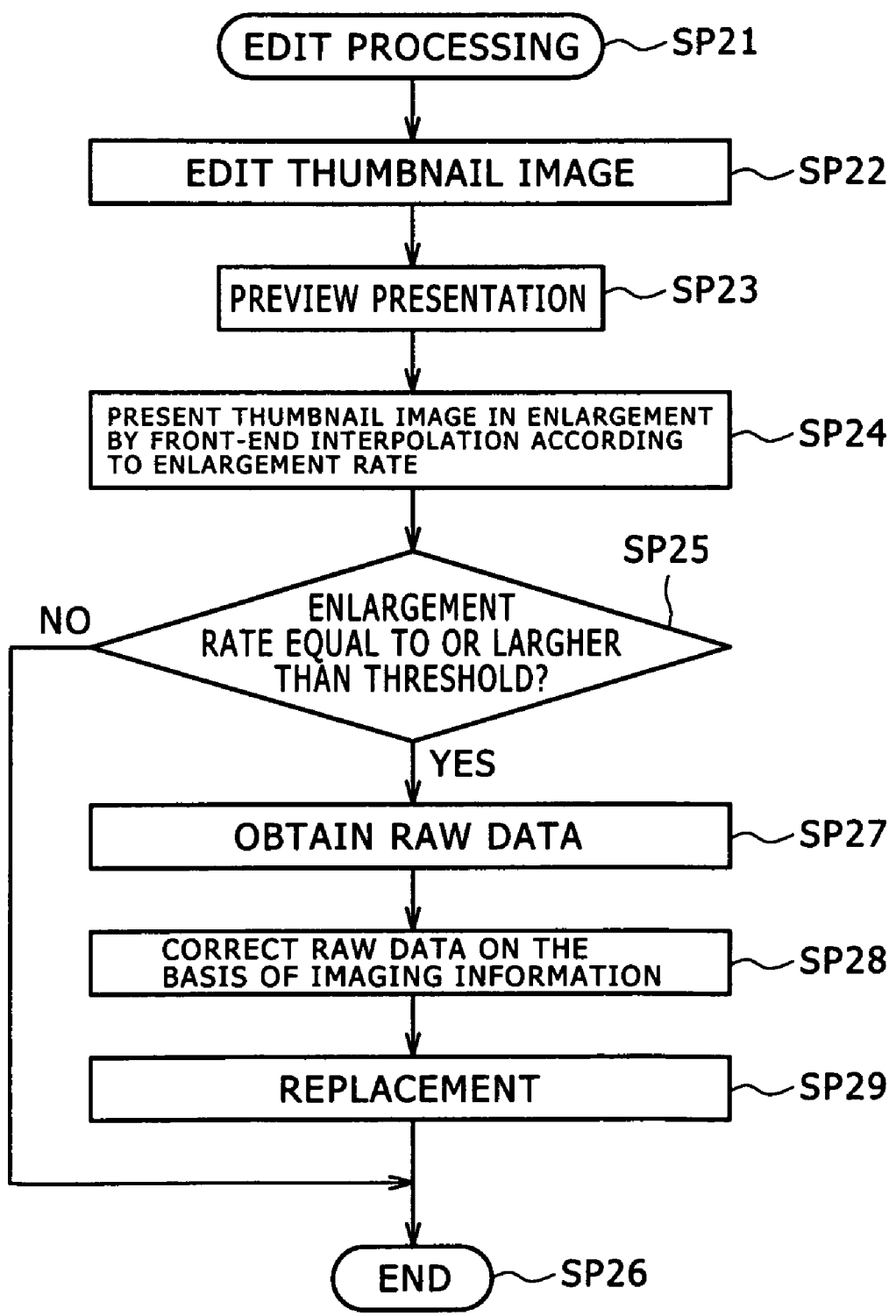
FIG. 12 is a flowchart illustrating a processing procedure in the edit processing.

More specifically, FIG. 12 shows a flowchart illustrating a processing procedure implemented as an edit processing by the CPU 23. Upon the user manipulating an adjustment amount in the sub window M6, the CPU 23 starts the processing procedure and the processing flow proceeds from step SP21 to step SP22. The CPU 23 corrects the imaging information DS0 at the time of imaging-result capturing on the basis of the adjustment amount set in the adjustment screen of the sub window M6, to generate imaging information of this edit processing. On the basis of this imaging information of the edit processing, the edit processing is implemented on the thumbnail image data DT, thereby adjusting the image quality of the thumbnail image. In the following step SP23, the CPU 23 switches the presentation of the sub window M7 of preview, to the thumbnail image having been subjected to the editing processing.

In the following step SP24, the CPU 23 calculates an enlargement rate used in presentation in each of the sub window M3 and the main screen M1. By a front-end interpolation corresponding to this enlargement rate, the thumbnail image having been subjected to the edit processing is presented in the sub window M3 and the main screen M1. Hence, the imaging result having been subjected to the edit processing can be presented in a short time in response to a manipulation by the user, thereby enhancing the user-friendliness.

Subsequently, the processing flow goes to step SP25, in which the CPU 23 determines whether the enlargement rate obtained in step SP24 is equal to or larger than a predetermined threshold, in order to determine whether replacing the thumbnail image currently presented in enlargement with the image based on the RAW data DR enhances the quality of the image presented. When a negative decision is obtained in this step, the processing flow proceeds from step SP25 to step SP26 in which the CPU 23 terminates the processing procedure.

On the other hand, when an affirmative decision is obtained in step SP25, the processing flow proceeds from step SP25 to step SP27 in which the CPU 23 obtains the RAW data DR from the RAW data file of the thumbnail image data DT currently presented in enlargement. In the following step SP28, the CPU 23 implements the edit processing on the RAW data DR, that is, corrects the RAW data DR on the basis of the imaging information of the thumbnail image currently presented in enlargement, and converts the resolution to correspond to the size of the area in which the image of the RAW data DR is to be presented.

In step SP29, the CPU 23 replaces the presentation in the sub window M3 and the main screen M1 with the image of the RAW data DR as has been processed in step SP28. The processing flow goes to step SP25 in which the CPU 23 terminates the processing procedure.

The processings of steps SP25-SP29 after the presentation of the thumbnail image in enlargement in step SP24 are implemented by the CPU 23 as so-called background processings that are implemented during the system is unoccupied. When the user changes an adjustment amount while the processings of steps SP25-SP29 are implemented, the CPU 23 immediately terminates the current cycle of the processing procedure of FIG. 12, and starts another cycle of the processing procedure taking into account the change in the adjustment amount.

On the other hand, when the user selects a button "Restore to the settings at the time of imaging-result capturing" in the sub window M6 for edit, the settings in the sub window M5 for edit are changed to the settings of the imaging information DS0 at the time of imaging-result capturing that is recorded in the RAW data file. When the user selects a button "Store the settings" in the sub window M6 for edit, the CPU 23 generates imaging information of the edit processing according to the settings in the sub window M6 for edit, and records this imaging information of the edit processing in the corresponding RAW data file. In this case, where there is left in the RAW data file no more empty areas with dummy data where the imaging information of the edit processing is recordable, the CPU 23 deletes imaging information of an edit processing that is already recorded in the RAW data file, and records the imaging information of this edit processing, in response to an instruction to do so by the user. In this case, a field may be added to enable recording of the imaging information of the edit processing, which additional field may be located after the RAW data.

Thus, when the RAW data file is again presented in accordance with the edit program, thumbnail images are processed on the basis of the additionally recorded imaging information of the edit processing, and presented in the form of a list, and further the series of processings related to the edit processing are implemented.

(2) Operation of the Embodiment

In the above-described electronic still camera 1 according to the system of the present embodiment (FIG. 1), an optical image is formed on the imaging surface of the image pickup element 3 in the optical system (not shown), under the settings such as those of the shutter speed and the aperture stop made by the user. By a manipulation of an operation element by the user, the optical image as the imaging result is outputted from the image pickup element 3 to be processed by the preprocessing circuit 4 and the optical correction circuit 5, whereby the RAW data DR as image data of the imaging result yet to be subjected to an image correction processing is generated. The RAW data DR is corrected by the image processing circuit 6 and presented on the display portion. According to the electronic still camera 1, an imaging result, which is determined to be unnecessary by the user upon viewing it presented on the display portion, is discarded without being recorded. On the other hand, an imaging result which is determined to be necessary by the user is recorded on the recording medium 9 in a storage format designated by the user. That is, in the latter case and where the user instructs to record the imaging result in Exif file format, the corrected image data is compressed by the ENC 7 and put into an EXIF file together with corrected thumbnail image data and imaging information, and this EXIF file is recorded on the recording medium 9. On the other hand, when the user instructs to record the imaging result in the form of RAW data DR, the RAW data DR is put into a RAW data file together with thumbnail image data DT generated by thinning the RAW data DR and the imaging information DS0 at the time of imaging-result capturing that includes image correction information specifying the image correction processing implemented by the image processing circuit 6, and the thus produced RAW data file is recorded on the recording medium 9.

The imaging result is thus recorded in the form of RAW data DR in the RAW data file, and when the imaging result is to be presented to the user in the form of a thumbnail image on the basis of the RAW data DR, the thumbnail image data DT is corrected on the basis of the image correction information so that the imaging result with the image quality as the user has viewed at the time of capturing the imaging result can be presented in the form of a thumbnail image. Since the processing of correcting the thumbnail image data on the basis of the image correction information and presenting the corrected thumbnail image data does not involve generation of thumbnail image data from the RAW data DR, the time taken for the user to view a presentation of the imaging result can be reduced, thereby further enhancing the user-friendliness.

Generally, RAW data has a large volume and loading it from a recording medium takes a considerably long time. According to this embodiment, however, only an initial portion of the RAW data beginning at the top of the file and ending at a position in the file at which the RAW data starts is loaded and processed, and the data amount of the initial portion is significantly smaller than the RAW data. Hence, it is enabled to present the imaging result in a significantly short time as compared to the conventional technique, thereby enhancing the user-friendliness.

According to the electronic still camera 1, the initial portion of the RAW data file (FIG. 2) is constituted by information on the main image data, the thumbnail image data having been corrected and JPEG-compressed, and others, and the RAW data DR is allocated to the last of the RAW data file, similarly to an EXIF file. Hence, according to the electronic still camera 1, even various application programs, which hardly process the fields F4-F13 recorded at the middle of the RAW data file, can process the RAW data DR and present the thumbnail image data having been corrected and JPEG-compressed. Thus, the versatility of the RAW data file is enhanced. It is noted that in an EXIF file, thumbnail image data before compressed is applicable in place of the thumbnail image data having been corrected and JPEG-compressed. Thus, instead of the thumbnail image data having been corrected and JPEG-compressed, the thumbnail image data before compressed may be applied.

According to the electronic still camera 1, the RAW data file is created to include the fields where the imaging information DS1-DS3 of edit processings, each corresponding to the imaging information DS0 at the time of imaging-result capturing, are additionally recordable. Hence, in subjecting the RAW data file to each edit processing, the imaging information DS1-DS3 of the edit processing that corresponds to the imaging information DS0 at the time of imaging-result capturing is additionally recorded, and the thumbnail image data is processed on the basis of the imaging information DS1-DS3 of the edit processing in place of the imaging information DS0 at the time of imaging-result capturing, thereby enabling to present in a reduced time the RAW data as the imaging result, in the form of a thumbnail image to which the result of the edit processing are reflected. Thus, the user-friendliness is further enhanced.

The imaging result can be recorded in the electronic still camera otherwise than in the form of RAW data as described above. That is, image data may be recorded after having been processed and compressed, like EXIF file. However, in an EXIF file, thumbnail image data having been processed is recorded so as to correspond to the image data processed and compressed. Thus, it is difficult to present a thumbnail image to which change in the image quality as a result of an edit processing is reflected. In contrast, in the RAW data file according to the present embodiment, the above-described imaging information of the edit processing is used to enable to reflect change in the image quality as a result of an edit processing to the presentation of the thumbnail image, thereby enhancing the user-friendliness.

The imaging information at the time of imaging-result capturing includes information on the settings of the optical system such as the shutter speed and aperture stop, in addition to the image correction information specifying the image correction processing by the image processing circuit 6. Hence, various settings corresponding to the manipulations made to the electronic still camera 1 at the time the imaging result has been captured can be changed in an edit processing, that is, various edit processings are possible.

The imaging results thus recorded on the recording medium 9 are presented by a list, such that the recording medium 9 is loaded in the computer 21 (FIG. 3), then the thumbnail image data and the imaging information DS0 at the time of imaging-result capturing are sequentially replayed in response to a manipulation by the user, and the thumbnail image data is corrected on the basis of the imaging information DS0 at the time of imaging-result capturing (FIGS. 4-7). Alternatively, the imaging results are presented by a list after downloaded to a predetermined folder. Hence, the user can get a thumbnail image in a reduced time by presenting imaging results of RAW data files in the form of a list of thumbnail images, thereby further enhancing the user-friendliness.

In the thus presenting imaging results in the form of thumbnail images, the thumbnail image data is corrected on the basis of the imaging information DS1-DS3 of an edit processing in place of the imaging information DS0 at the time of imaging-result capturing, as needed, and the corrected thumbnail image data is presented. Thus, a change in the image quality due to an edit processing is reflected when the imaging result is presented on the basis of the RAW data and in the form of a thumbnail image included in a list of thumbnail images.

While the list is presented, when it is instructed to present a result of the analysis of the image data such as a luminance distribution and a color histogram of the imaging result, the result of the analysis to be presented is detected by processing the thumbnail image data, and a characteristic curve representative of the analysis result is presented with the thumbnail image (FIG. 5(B)). Since this presentation in the embodiment is also implemented by analyzing the thumbnail image data, the analysis result can be obtained and presented in a significantly short time, enhancing the user-friendliness.

That is, the imaging result in the form of RAW data is treated such that while the thumbnail image thereof is presented in this way, the imaging information DS0 at the time of imaging-result capturing and others (FIGS. 9 and 10) and the menu screen M6 for edit (FIG. 11) are presented in response to a manipulation by the user. Then, in response to a manipulation by the user in the menu screen M6 for edit, the thumbnail image data is corrected and presented in the preview screen M7 (FIG. 4), and further a result of analysis of the imaging result presented in the preview screen M7 is presented (FIG. 4, M8).

When the presentation in enlargement in the sub window M3 or the full-screen presentation in the main screen M1 is instructed upon this preview processing, the corrected imaging result is presented in the instructed one of the sub window M3 and the main screen M1, concurrently with the presentation in the preview screen. When it is instructed to present in enlargement a part or an area in the image presented in the preview screen, this area is presented in the sub window M3 or the main screen M1 in enlargement.

In this processing, the imaging result is treated such that the thumbnail image data DT is first corrected in accordance with the conditions set by the user and presented in the sub window M3 or the main screen M1, then the RAW data DR is processed in background, and the image presented in the sub window M3 or the main screen M1 is replaced with a presentation of the RAW data DR.

Hence, when the user changes various settings related to an edit processing, the user can immediately view the image changed due to the change in the settings, and thus the user-friendliness is enhanced. Since the RAW data DR is processed in background and replaces the presented thumbnail image, the details of the result of the editing can be viewed in the form of an image of the RAW data DR that is actually subjected to the edit processing, whereby the user-friendliness is enhanced.

According to this system, when the user diversely produces imaging information of an edit processing by changing the imaging information at the time of imaging-result capturing, and instructs to store the result of the editing, the imaging information of the edit processing is additionally recorded in the corresponding field in the RAW data file, so that in a replay of the file thereafter the image quality according to the result of the editing can be reflected in presentation of the thumbnail image.

(3) Effects of the Embodiment

According to the above-described arrangement, the time taken to present to the user RAW data as an imaging result, in the form of a thumbnail image, can be reduced, by recording the thumbnail image data produced by thinning the RAW data along with the RAW data and the image correction information at the time of imaging-result capturing that is used in the presentation.

By recording the RAW data and the others such that the imaging information of edit processings each of which corresponds to the imaging information at the time of imaging-result capturing are additionally recordable, it is enabled to store a result of an edit processing by adding imaging information of the edit processing, and to present the RAW data as the imaging result in the form of a thumbnail image with change in the image quality due to the edit processing reflected thereto.

By recording the image correction information as well as the information on the settings of the optical system, as the imaging information at the time of imaging-result capturing, various settings can be made in an edit processing through the same user interface as used in making the settings of the electronic still camera at the time of capturing the image data. Hence, the user-friendliness is enhanced.

Further to these features, the image data of the corrected thumbnail image is recorded, thereby enhancing the versatility.

By recording the thumbnail image data obtained by thinning the RAW data, along with the RAW data and the imaging information at the time of imaging-result capturing that includes the image correction information at the time of imaging-result capturing used in the presentation, correcting the thumbnail image data on the basis of the image correction information, and presenting the corrected thumbnail image by a list, the time taken to present to the user the RAW data as the imaging result in the form of a thumbnail image can be reduced.

By correcting the thumbnail image data on the basis of the imaging information of an edit processing that corresponds to the information at the time of imaging-result capturing, presenting the corrected thumbnail image data, and additionally recording the imaging information of the edit processing, a result of the editing can be stored such that the time taken to view the result of the editing is reduced, and the result of the editing can be presented in the form of a thumbnail image in a short time.

By correcting the RAW data on the basis of the imaging information of the edit processing, and replacing the presented thumbnail image to which the result of the edit processing is reflected, with the corrected RAW data, the user can view the result of the editing processing in a short time, and can view the details of the result of the edit processing in the form of an image of the RAW data that is actually subjected to the edit processing.

By applying the presentation of the thumbnail image to which the result of the edit processing is reflected to presentation of a part of the image in enlargement for preview, correcting the RAW data on the basis of the imaging information of the edit processing, and replacing the presentation of the thumbnail image to which the result of the edit processing is reflected with the corrected RAW data, the response of the preview image to a manipulation of the user can be enhanced, as well as the image of the RAW data that is actually subjected to the edit processing can be viewed.

(4) Other Embodiments

According to the above-described embodiment, the thumbnail image data before corrected and the thumbnail image data after corrected are set in the RAW data file. However, the invention is not limited thereto, but setting of the corrected thumbnail image data in the RAW data file may be omitted, as needed.

According to the above-described embodiment, the imaging result obtained by the electronic still camera is outputted to the recording medium and processed by the computer. However, the invention is not limited thereto, but is widely applicable, for instance, to a case where the imaging result is outputted to a computer to be processed thereby, by way of a data communications means such as radio communications.

According to the above-described embodiment, the imaging result obtained by the electronic still camera is processed by the computer. However, the invention is not limited thereto, but is widely applicable to a case where an imaging result obtained by an electronic still camera is subjected to an edit processing by the electronic still camera itself According to the above-described embodiment, the imaging result is obtained by the electronic still camera. However, the invention is not limited thereto, but is widely applicable, for instance, to a case where a still image is obtained as an imaging result by a camcorder, a mobile phone with camera, or others.

According to the above-described embodiment, the computer processes the imaging result. However, the invention is not limited thereto, but is widely applicable to a case where a dedicated processing apparatus processes the imaging result.

Industrial Applicability

The invention is applicable to a system applied to an electronic still camera, for instance.

The invention claimed is:

1. An imaging apparatus comprising:
    an image pickup element for outputting an imaging result of an optical image formed on an imaging surface;
    an optical system for forming the optical image on the imaging surface;
    an analog-to-digital converting portion for converting the imaging result from analog to digital and outputting image data yet to be corrected;
    an image processing portion for subjecting the image data to an image correction processing and outputting the image data subjected to the image correction processing;
    a display portion for presenting an image of the image data subjected to the image correction processing;
    a pre-correction thumbnail-image-data generating portion for generating thumbnail image data yet to be corrected representative of a number of thumbnail images, by reducing resolution of the image data yet to be corrected in a vertical direction and a horizontal direction by use of a low-pass filter configured to perform a predetermined operation and thereafter by thinning the reduced resolution image data yet to be corrected in the vertical direction and in the horizontal direction;
    a corrected thumbnail-image-data generating portion for generating corrected thumbnail image data from the image data subjected to the image correction processing which is compressed in accordance with a JPEG (Joint Photographic Coding Experts Group) format;
    a data outputting portion for creating a file of the imaging result from the image data yet to be corrected, the thumbnail image data yet to be corrected, the corrected thumbnail image data and imaging information at the time of imaging-result capturing which includes at least image correction information which specifies the image correction processing by the image processing portion, and outputting the file,
    such that the outputted file has both the thumbnail image data yet to be corrected representative of the number of thumbnail images which were generated by thinning the image data yet to be corrected in the vertical direction and in the horizontal direction, and corrected thumbnail image data generated from the image data subjected to the image correction processing which is compressed in accordance with the JPEG format.

2. The imaging apparatus according to claim 1, characterized in that:
    imaging information of an edit processing which corresponds to the imaging information at the time of imaging-result capturing is additionally recordable to the file of the imaging result.

3. The imaging apparatus according to claim 1, characterized in that:
    the imaging information at the time of imaging-result capturing includes the image correction information and information on settings of the optical system.

4. The imaging apparatus according to claim 1, in which the predetermined operation involves processing performed by the low-pass filter which utilizes a following expression:

$$(1 \times d1 + 2 \times d2 + 2 \times d3 + 1 \times d4)/8, \text{ where d1-d4 represent consecutive sampling values.}$$

5. An imaging result processing method for subjecting image data of an imaging result obtained by an image pickup element to an image correction processing, and presenting the image data having been subjected to the image correction processing on a display portion, the method comprising:
    generating corrected thumbnail image data from the image data subjected to the image correction processing which is compressed in accordance with a JPEG (Joint Photographic Coding Experts Group) format; and
    creating a file of the imaging result from the image data yet to be corrected, thumbnail image data yet to be corrected representative of a number of thumbnail images which is obtained by reducing resolution of the image data yet to be corrected in a vertical direction and a horizontal direction by use of a low-pass filter configured to perform a predetermined operation and thereafter by thinning the reduced resolution image data yet to be corrected in the vertical direction and in the horizontal direction, the corrected thumbnail image data and imaging information at the time of imaging-result capturing which includes at least image correction information which specifies the image correction processing, and outputting the file,
    such that the outputted file has both the thumbnail image data yet to be corrected representative of the number of thumbnail images which were generated by thinning the image data yet to be corrected in the vertical direction and in the horizontal direction, and corrected thumbnail image data generated from the image data subjected to the image correction processing which is compressed in accordance with the JPEG format.

6. The imaging result processing method according to claim 5, characterized in that:
    imaging information of an edit processing which corresponds to the imaging information at the time of imaging-result capturing is additionally recordable to the file of the imaging result.

7. The imaging result processing method according to claim 5, in which the predetermined operation involves processing performed by the low-pass filter which utilizes a following expression:

$$(1 \times d1 + 2 \times d2 + 2 \times d3 + 1 \times d4)/8, \text{ where d1-d4 represent consecutive sampling values.}$$

* * * * *